(12) United States Patent
Raban (10) Patent No.: US 6,752,234 B2
(45) Date of Patent: Jun. 22, 2004

(54) LOCKING MECHANISM FOR PROTECTION OF THE HYDRAULIC CIRCUIT, CALLED HYDRA LOCK, MOSTLY FOR TRUCKS

(75) Inventor: David Raban, Etten-Leur (NL)

(73) Assignee: Raban-Lock International B.V., Sliedrecht (NL)

( * ) Notice: Subject to any disclaimer, the term of this patent is extended or adjusted under 35 U.S.C. 154(b) by 0 days.

(21) Appl. No.: 09/926,333
(22) PCT Filed: Feb. 14, 2001
(86) PCT No.: PCT/NL01/00123
 § 371 (c)(1),
 (2), (4) Date: Jan. 17, 2002
(87) PCT Pub. No.: WO01/58737
 PCT Pub. Date: Aug. 16, 2001

(65) Prior Publication Data
US 2003/0047373 A1 Mar. 13, 2003

(30) Foreign Application Priority Data
Feb. 14, 2000 (NL) .............................. 1014376

(51) Int. Cl.⁷ ............................................. B60K 28/00
(52) U.S. Cl. ..................................... 180/271; 180/287
(58) Field of Search ................................ 180/271, 287; 137/384.2; 90/530; 70/176, 237

(56) References Cited

U.S. PATENT DOCUMENTS

| | | | | |
|---|---|---|---|---|
| 3,401,545 A | * | 9/1968 | Fraser | 137/384.4 |
| 3,557,584 A | * | 1/1971 | Triglia | 70/179 |
| 4,402,339 A | * | 9/1983 | Owens | 137/384.6 |
| 4,633,686 A | * | 1/1987 | Carr | 70/179 |
| 4,658,608 A | * | 4/1987 | Fox | 70/179 |
| 4,669,570 A | * | 6/1987 | Perret | 180/287 |
| 4,765,362 A | * | 8/1988 | Baruch | 137/384.2 |
| 4,881,615 A | * | 11/1989 | Conway | 180/287 |
| 5,370,449 A | * | 12/1994 | Edelen et al. | 303/3 |
| 5,375,684 A | * | 12/1994 | Ben Asher et al. | 188/353 |
| 5,454,292 A | * | 10/1995 | Oudelaar | 91/446 |
| 5,477,939 A | * | 12/1995 | Childress | 180/287 |
| 5,547,039 A | * | 8/1996 | Berger et al. | 180/287 |
| 5,666,809 A | * | 9/1997 | Mentink | 60/484 |
| 5,682,807 A | * | 11/1997 | Mentink | 91/530 |

FOREIGN PATENT DOCUMENTS

| | | |
|---|---|---|
| EP | 0 203 894 | 12/1986 |
| EP | 0 572 258 | 12/1993 |

* cited by examiner

Primary Examiner—Paul N. Dickson
Assistant Examiner—Deanna Draper
(74) Attorney, Agent, or Firm—Oblon, Spivak, McClelland, Maier & Neustadt, P.C.

(57) ABSTRACT

The invention relates to a locking mechanism (1) for electromechanical protection of the hydraulic circuit of mechanically driven vessels/boats and vehicles, mostly trucks, but also private cars can be equipped with it, in which the steering gear and/or braking system can be blocked, in which a core cylinder (13) of the roughly 3/2-valve constructed locking mechanism (1) is operated by electronic control, in which in the driving position the mentioned core cylinder (13) is locked or blocked, in which the locking mechanism with accompanying electronic control (9) is mounted in a closed steel housing underneath the bonnet, which is also secured by the system and in which also an encoder unit (4) for further protection is provided, through which an optimally secure locking mechanism (1) against theft is created.

9 Claims, 7 Drawing Sheets

LOCKED

Fig.1

DRIVE

LOCKING MECHANISM FOR PROTECTION OF THE HYDRAULIC CIRCUIT, CALLED HYDRA LOCK, MOSTLY FOR TRUCKS

The present invention relates to a locking mechanism for protection of the hydraulic circuit, called hydra lock, for preferably mechanically driven vehicles, including vessels/boats, in which in mentioned hydraulic circuit for example the steering gear and/or braking system can be admitted in order to prevent the illegal use of mentioned mechanically driven vehicles, in which the mentioned locking mechanism for protection of the hydraulic circuit can contain a valve of a special construction with a housing provided with inlet and outlet ports for hydraulic fluid and a drivable inner core instrument in the form of a movable cylinder inside the mentioned housing also provided with bores, which can correspond with mentioned inlet and outlet ports in order to form the required passage.

A similar safety device or system is known in the American patent title: "Anti-Theft System for Vehicles" by Yehuda Baruch from Israel, number 4,765,362, dated Aug. 23, 1988.

It concerns a locking mechanism or system for installation mostly in Trucks to prevent illegal use of them. It concerns a construction of a 3/2-valve for placement in the hydraulic circuit of the concerned truck. The mentioned 3/2-valve has a special construction, in which in a tubular housing and inlet and outlet valve are applied, which can correspond with bores in the movable solid core cylinder inside the housing for either or not passing of the hydraulic fluid. The system works on the steering system on one hand and on the braking circuit on the other hand. The control of the movable solid cylinder takes place directly by means of a key and lock construction at the upper side of it, in which by means of spring loaded balls in the bores of the movable solid core cylinder, ports and bores are sealable and the position of the core cylinder is stabilized.

The safety is based on sealing the return circuit of the hydraulic system by means of a 3/2-valve, which can be turned mechanically in two positions with a key. The existing return mains of the steering gear housing (or brake housing) is interrupted and between this the valve is mounted which is normally in the opened position. Also, the pump pressure pipe is connected on the third port. The ignition key is applied on the dashboard, by which the valve part is situated in the motor compartment.

When sealing the hydraulic system a by-pass of the pump pressure to the (bleeded) oil-storage tank is created at the same time. So, the steering gear and/or braking system does not receive any supply pressure anymore and simultaneously the outgoing pipes are blocked. The pump cannot supply pressure anymore because the oil can flow freely into the bleeded oil-storage tank.

The known locking mechanism or system has the following disadvantages, namely that professional educated thieves can quite quickly break into or crack the system by means of manipulation of the lock construction with key means. Furthermore is an extra key an extra element for the truck driver that he has to treat carefully and that could easily be stolen on resting areas, through which stealing the truck becomes rather easy. Further the hydraulic circuit around the locking mechanism can be short-circuited with extra wires. From the above follows that the known locking mechanism has several disadvantages concerning safety, such as:

- the system can be influenced manually with a key, also during driving;
- the mechanical system is not combined with advanced modem electronics; and
- during driving thee is not absolute guarantee that the valve cannot block spontaneously.

The increasingly ongoing safety laws and demands from insurance companies caused the need for advanced and absolutely safe equipment. The system must not be controlled by human intervention and may absolutely not be able to block spontaneously during driving.

The aim of the present invention is to provide in a locking mechanism as such, which eliminates the above described disadvantages.

Figure 4:
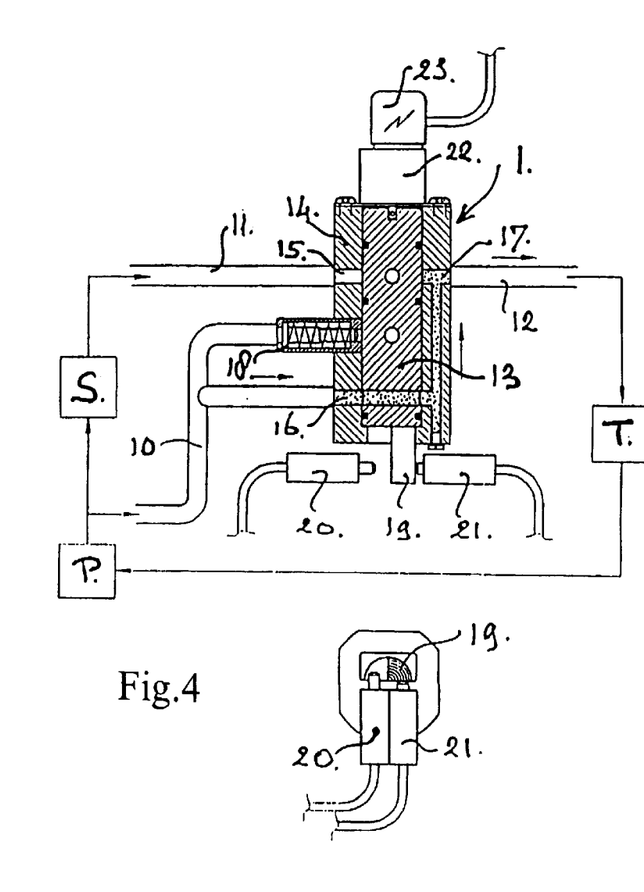
FIG. 4 is a schematic structure of the locking mechanism with a rotating core cylinder in a fixed angle of for example 90° in locked position according to the invention.
Figure 5:
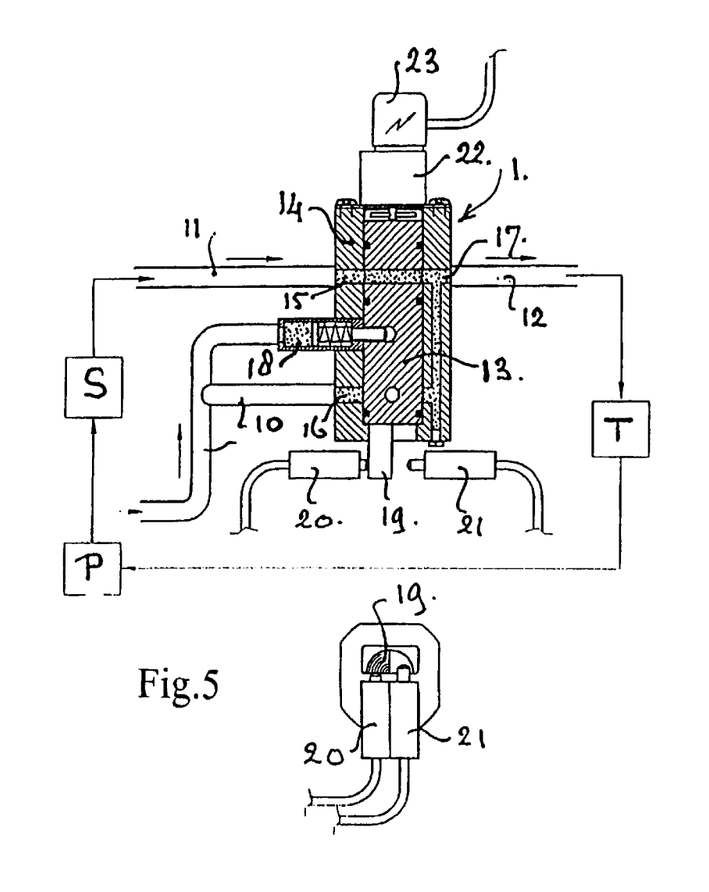
FIG. 5 is ditto for the drive or released or deblocked position.
Figure 6:
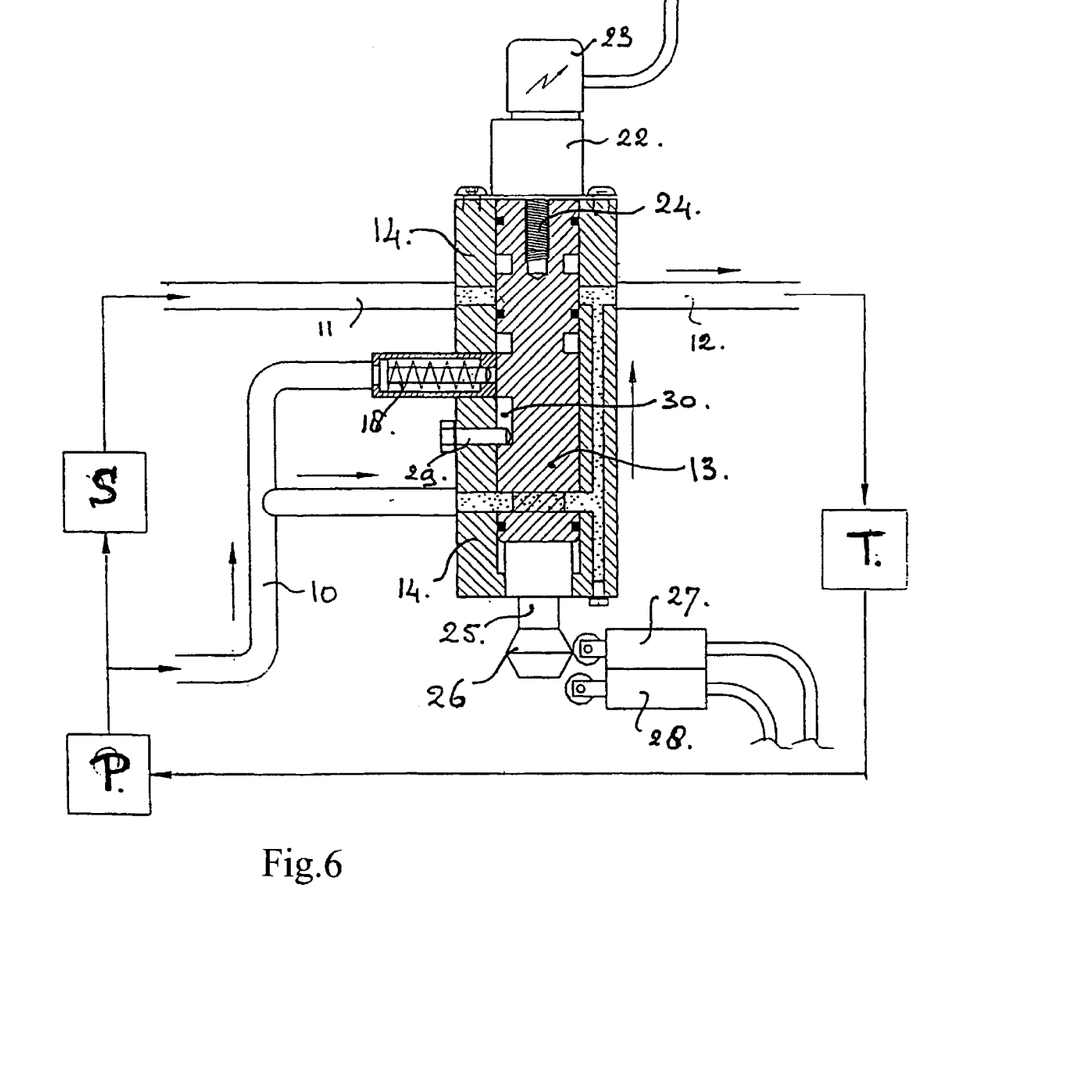
FIG. 6 is a schematic structure of the locking mechanism with an up and down movable core cylinder operated by means of a spindle in locked position according to the invention.
Figure 7:
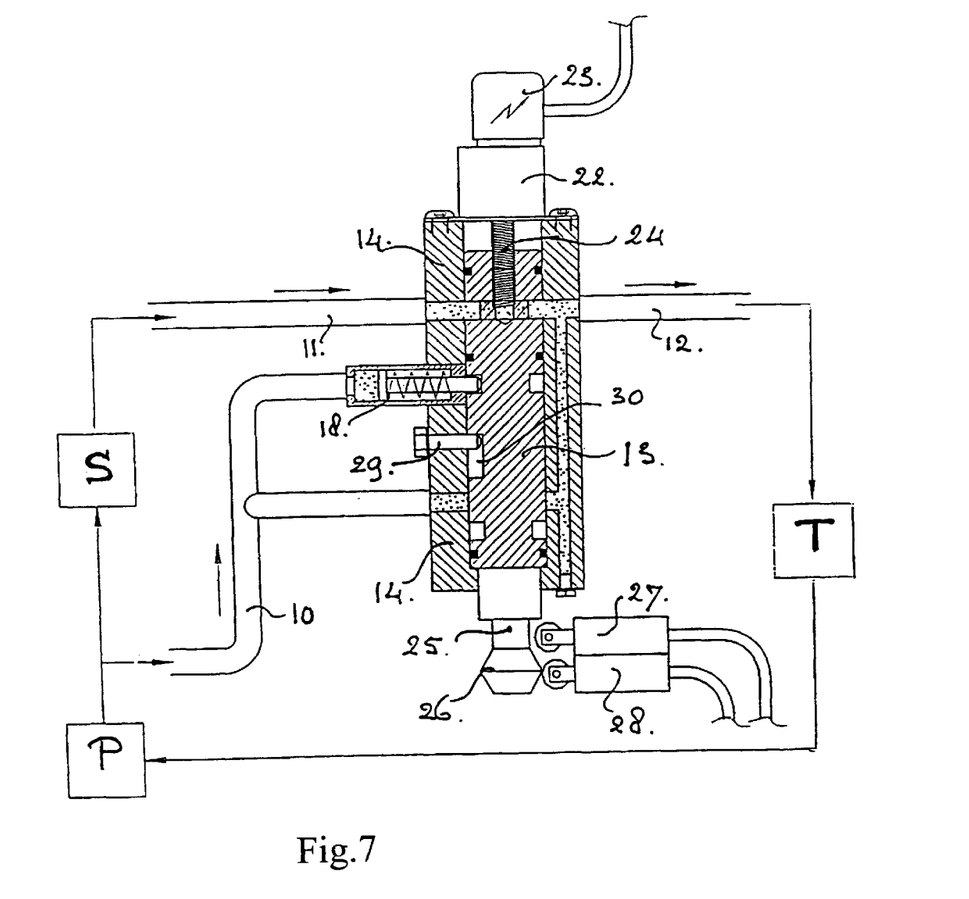
FIG. 7 is ditto for the drive or released or deblocked position.
Figure 8:
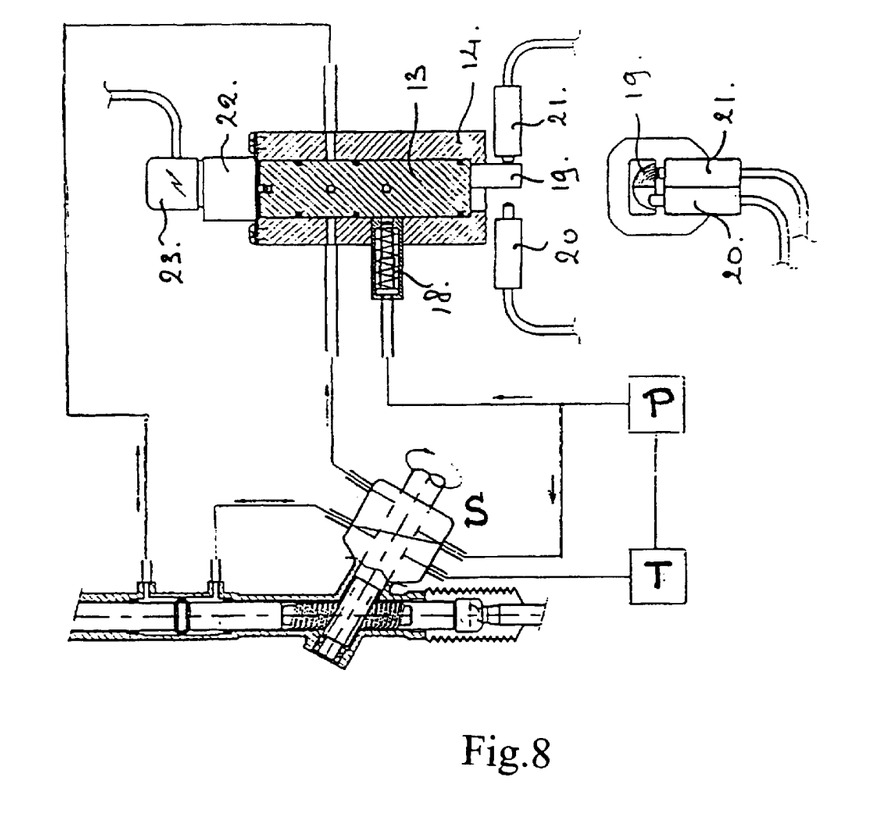
FIG. 8 is a schematically improved structure of the locking mechanism for installation in different steering gear housing constructions of smaller vehicles, such as private cars or vessels, with a rotating core cylinder in a fixed angle of for example 90° in locked position according to the invention.
Figure 9:
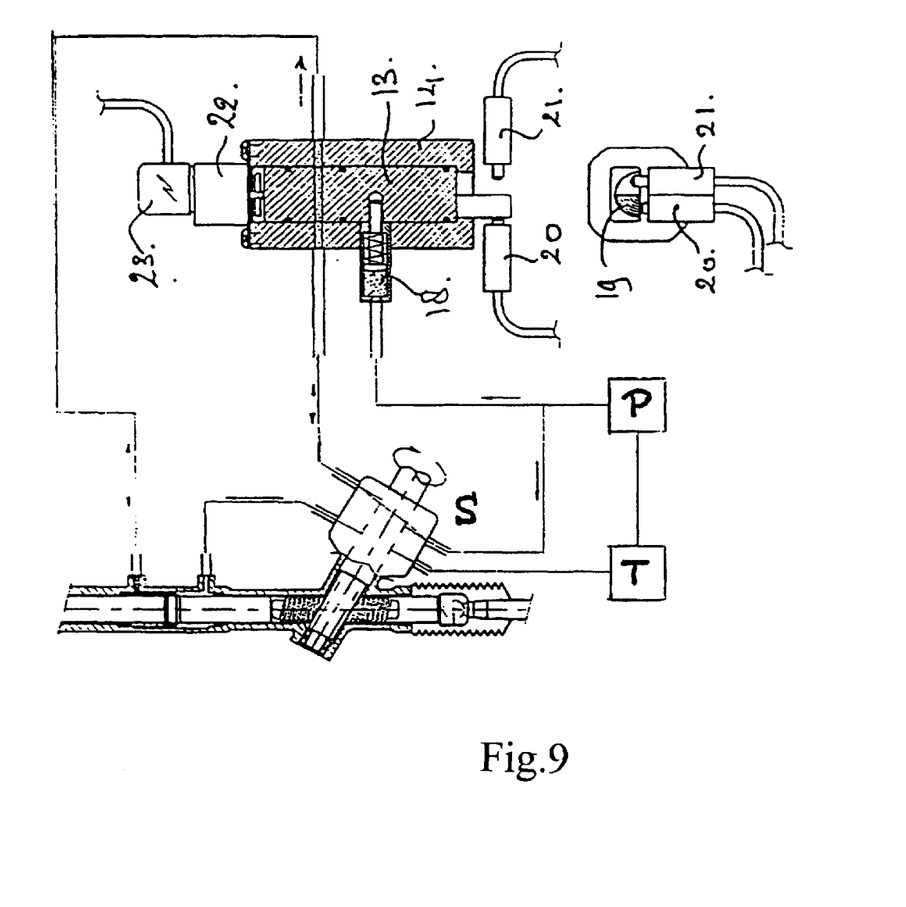
FIG. 9 is a schematically improved structure of the locking mechanism for installation in different steering gear housing constructions of vessels and smaller vehicles, such as private cars, with a rotating core cylinder in a fixed angle of for example 90° in drive of released or deblocked position according to the invention.

For this purpose a locking mechanism is developed as such in a very inventive way, that the mentioned locking mechanism is composed of a cylindrical tubular housing provided with two inlet ports one outlet port, a special inlet port with a locking or securing cylinder for operation of a safety pin, in which in mentioned cylindrical tubular housing a movable solid core cylinder with bores is applied, so that roughly the working of a 3/2-valve arises, in which the mentioned solid core cylinder by means of an electromotor with reduction gearbox can be mechanically driven, in which the drive of the mentioned electromotor takes place by an electronic circuit, in which also an encoder unit with starter, a sensor for the lock of the bonnet and a sensor for the oil pressure and such are included, in which the mentioned locking mechanism together with the mentioned electronic circuit is mounted in a closed steel housing, which is build in under the bonnet preferably on a difficult reachable place, which locking mechanism is applied in mentioned hydraulic circuit of the mechanically driven vehicle, also called automobile and often truck, or it can also be a vessel in which the in the hydraulic circuit the built in locking mechanism is diagrammatically indicated and of which the working is shown in FIGS. 1, 4, 6 and 8 in the so called blocked position and in FIGS. 2, 5, 7 and 9 in the so called driving or deblocked position, and by which the mentioned locking cylinder for operating the safety pin is indicated in FIGS. 5, 7 and 9, by which the locking of the mentioned solid core cylinder for reasons of safety is indicated with bores in the driving or release or deblocked position and in FIGS. 4, 6 and 8, as indicated because of the fall out of the pressure of the hydraulic fluid, is there no more locking of the mentioned core cylinder.

The advantages and details of the locking mechanism according to the present invention mentioned in claim 1 are described below. The rotatable valve is maintained but the control is now done by means of a small electromotor with reduction gear unit. The complete unit, including the electronics, is mounted in a steel demolition-proof construction. In order to be able to start the motor, one must, while starting the vehicle, enter a unique electromagnetic code on the dashboard. This last system is unique in combination with the hydraulic locking mechanism. Further there is an automatic mechanical safety device against the rotation of the valve during driving, currently a requirement in relation to safety. This lock is achieved by a special, hydraulic spring return cylinder (locking cylinder) that is operated by the oil or hydraulic fluid and that is fixedly mounted on the valve body. After stopping the motor of the vehicle the oil pressure falls after some time (about 30 seconds), the locking or securing cylinder pulls itself out of the piston by its own spring force and thus the displacement of the core cylinder to the anti-theft position shall be made possible again. Conversely the safety pin of the locking or safety cylinder can protrude again (=locking during driving) as soon as the oil pressure on the mentioned cylinder occurs. This oil pressure arises when the motor of the vehicle is started according the secured electronic procedure, the pump then starts building up pressure on the hydraulic system o the leads and the valve motor seals the free by-pass to the oil reservoir (at the same time the sealing of the return oil of the steering gear is released). If during this procedure the safety pin of the locking cylinder knocks against the core cylinder too soon and consequently cannot yet fall into the lock, it will not be a problem. The core cylinder is made of steel and is for running in with the reduction gear unit and such. When the core cylinder is brought into the correct position by the motor the safety pin will still fall into the lock.

Following the locking mechanism according to the invention in a first variant is further developed wherein the mentioned core cylinder can be moved in an up- and down going movement by means of a spindle construction driven by mentioned electromotor with reduction gearbox, as indicated in FIGS. 6 and 7 and by which the electronic system is switched by means of a protruding shaft with collar.

The advantage of this is a solid and very safe lockable solution. The movement is realized by a spindle, which is driven by an electromotor. In order to lock the piston against rotating a locking pin is screwed in the housing. The locking pin can, in a longitudinal groove make the correct movement of the piston possible. Here, two switches can also detect the actual position.

Then the locking mechanism according to the invention in a second variant is further developed in such a way that the mentioned core cylinder is rotatable by means of the shaft of the electromotor with reduction gearbox over a fixed angle of for example 90°, in which a protruding quarter part of the shaft, which is connected with the mentioned core cylinder, operate the switches of the electronic system.

The advantage of this is also a solid and very safe lockable locking mechanism. The piston position is limited in the utmost positions by two cams that make a maximum rotation in a fixed angle possible of for example 90°. Also, on these cams two limit switches are mounted, which are connected with the electronic circuit. If the piston would rotate without permission, the piston valve motor will start the rotation again till the end position and stops.

Further the locking mechanism according the invention is further developed in such a way, that the construction of the mentioned electromotor and electronics is such that these can work on a battery voltage of approximately 8 Volt.

The advantage is that the electromotor and the electronics already work at a battery voltage of 8 Volt (usually 12 Volt). While stopping with a half charged battery one can thus still switch to the anti-theft position.

The invention will now be further described with reference to the annexed drawings, in which.

Figure 1:
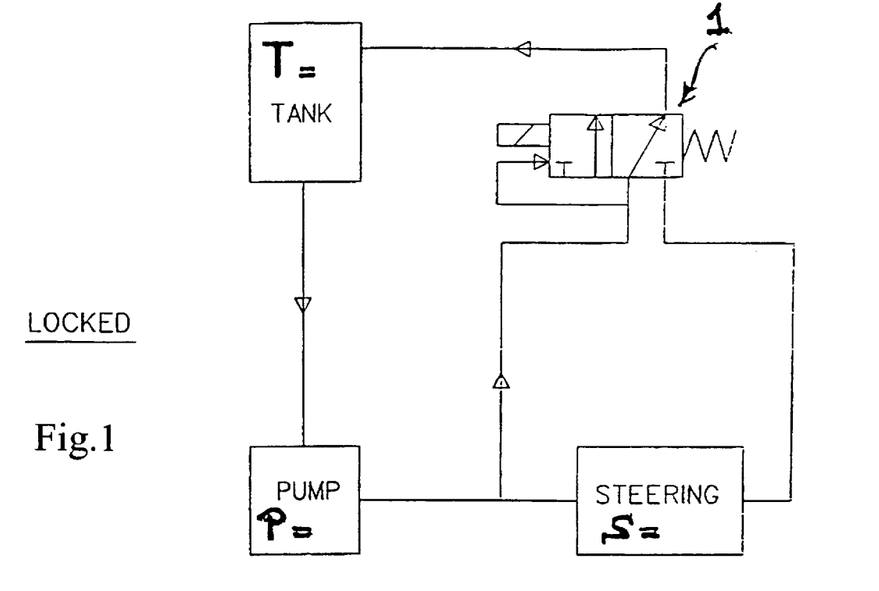
FIG. 1 is a diagram of the hydraulic circuit with the locking mechanism according to the invention in the locked position.
Figure 2:
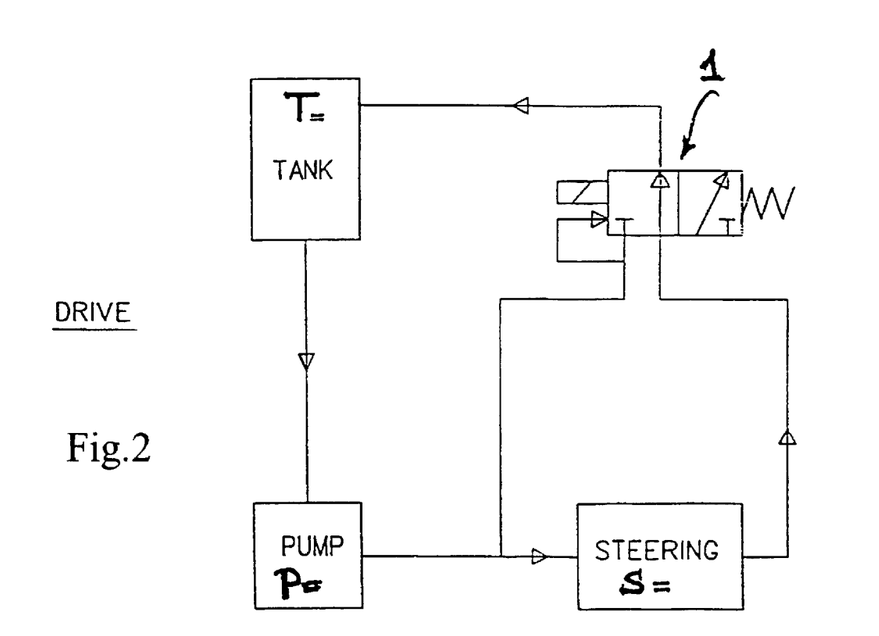
FIG. 2 is ditto for the drive or released or deblocked position.

In FIGS. 1 and 2 a rough diagram is shown of the hydraulic circuit with mounted therein a locking mechanism 1 according to the invention, in which FIG. 1 shows the locked position by symbols and FIG. 2 shows the drive or released or deblocked position thereof. The diagrams are further clear with regard to the several parts of the required working or operation or driving of the different parts. The letter P=pump, T=tank (reservoir), S=control. This also is applied to the rest of the figures.

Figure 3:
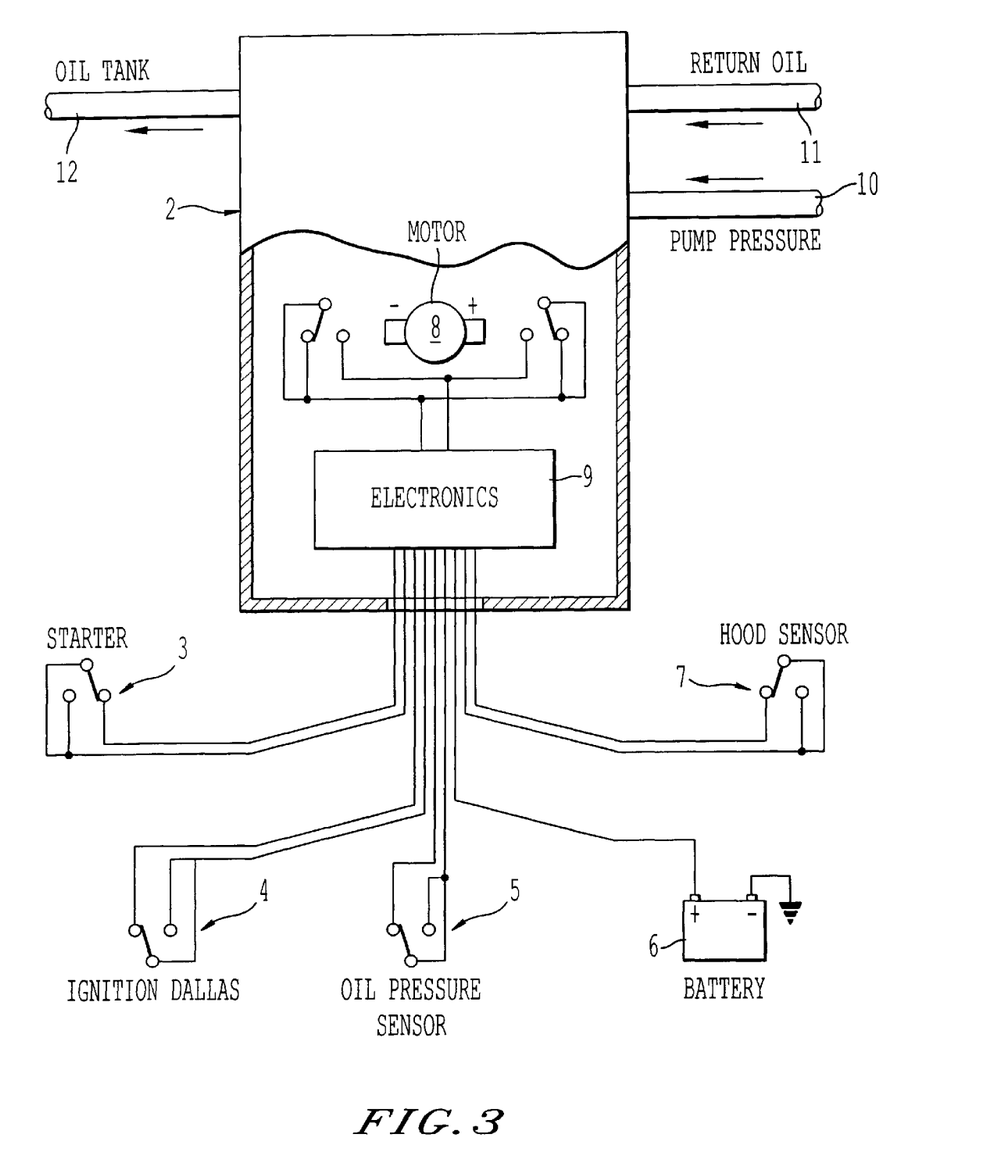
FIG. 3 is a schematic diagram of a closed steel housing including external electrical inputs.

In FIG. 3 a schematic diagram is shown of the closed steel housing 2 including the external electrical inputs 3, 4, 5, 6, 7. It concerns the starter 3, the encoder unit Dallas 4, the oil pressure sensor 5, the battery 6 and the sensor for the bonnet 7. In the exploded view of the steel housing 2 are further indicated the electromotor 8 and the control board 9 of the electronic circuit. The pipe or lead 10 has the pump pressure, pipe or lead 11 the return oil and pipe or lead 12 has the pipe to the reservoir for hydraulic fluid.

In FIGS. 4 and 5 a schematic structure is indicated of the locking or blocking mechanism 1 with the core cylinder 13 rotating in a fixed angle of for example 90° in the cylindrical tubular housing 14 with the inlet ports 15 and 16 and the outlet port 17. Further the locking cylinder with locking pin 18 is indicated. The protruding quarter part of the cylindrical shaft 19 controls the electronic switches 20 and 21. The core cylinder is driven by the electromotor 23 by means of a reduction gearbox 22.

In FIGS. 6 and 7 the schematic structure shows the locking mechanism with spindle control with the up and down movable core cylinder 13 in locked or blocking position (FIG. 6) and in released or deblocked position (FIG.

7). The electromotor 23 with reduction gearbox 22 hereby drives a spindle 24. The core cylinder 13 is extended with a shaft 25 with collar or ring 26 and thus operates the electronic switches 27 and 28. Furthermore the core cylinder 13 is locked or blocked against rotation by means of a locking or blocking pin 29 movable in a groove 30.

In FIGS. 8 and 9 a schematic installation is shown of a locking mechanism 1 for smaller vehicles such as private cars or vessels, with rotating core cylinder 13. The working of the locking mechanism is the same as the one described in FIGS. 4 and 5, but the hydraulic circuit has a different connection by which it becomes possible to use the locking or blocking mechanism also on different steering gear housing structures. Especially on private cars or vessels it is not sufficient enough to lock the return pipe or lead of the steering gear housing. In order to make movement of the steering column in this case impossible, one of the two separate accessible secondary leads to the operating cylinder of the steerage must be blocked. In this case the primary return pipe or lead does not have to be locked, so that one port on the locking mechanism can be cancelled in this application. In fact the function becomes a 2/2-valve. Herewith the purpose of the locking cylinder is maintained. In practice the third port can be plugged out, so that a standard component will be sufficient for all applications.

Finally, it will be appreciated, that two preferred embodiments of the locking mechanism according to the invention have been described and that further modifications are possible without leaving the scope of this patent document.

What is claimed is:

1. Locking mechanism for protection of a hydraulic circuit, which hydraulic circuit comprises a pump, a tank and a hydraulically operable element, the locking mechanism comprising a 3/2-valve with a movable core cylinder inside a valve housing, the valve housing having two inlet ports, one inlet port being connectable to the pump and the other inlet port being connectable to a return pipe of said hydraulically operable element, said valve housing further having one outlet port, said outlet port being connectable to the tank, the core cylinder having bores so that in a first position the pump is connected to the tank and in a second position the return pipe of the hydraulically operable element is connected to the tank, wherein the locking mechanism is provided with a locking cylinder having a safety pin, which safety pin is movable between a locked position, wherein said safety pin locks the core cylinder in the second position thereof, and an unlocked position, wherein said core cylinder is moveable between said first and second position, said locking cylinder having an inlet port being connectable to the pump, so that said safety pin is urged towards the locked position upon pressurization of the locking cylinder by the pump.

2. Locking mechanism according to claim 1, wherein said movable core cylinder is rotatable within said valve housing.

3. Locking mechanism according to claim 1, wherein said movable core cylinder is moveable axially within said valve housing.

4. Locking mechanism according to claim 1, wherein a return spring is associated with said safety pin, so that the safety pin is biased towards the unlock position in the absence of pressurization of the locking cylinder by the pump.

5. Locking mechanism according to claim 1, in which the locking mechanism further comprises an electromotor and reduction gearbox driving said movable core cylinder.

6. Locking mechanism according to claim 1, wherein an electronic circuit is associated with said electromotor, said electronic circuit comprising an encoder unit for entering a code so that the electromotor becomes operable.

7. Locking mechanism according to claim 1, wherein an electronic circuit is associated with said electromotor, said electronic circuit comprising an oil pressure sensor which detects an oil pressure in said hydraulic circuit.

8. Locking mechanism according to claim 1, wherein an electronic circuit is associated with said electromotor, said electronic circuit comprising limit switches detecting the position of the movable core cylinder.

9. A locking mechanism for protection of a hydraulic circuit, which hydraulic circuit comprises a pump, a tank and a hydraulically operable element, the locking mechanism comprising a valve with a movable core cylinder inside a valve housing, the valve housing having one inlet port and one outlet port, the core cylinder having bores so that in a first position the inlet port is connected to the outlet port and in a second position the inlet port is blocked, wherein the locking mechanism is provided with a locking cylinder having a safety pin, which safety pin is movable between a locked position, wherein said safety pin locks the core cylinder in the second position thereof, and an unlocked position, wherein said core cylinder is moveable between said first and second position, said locking cylinder having an inlet port being connectable to the pump, so that said safety pin is urged towards the locked position upon pressurization of the locking cylinder by the pump.

* * * * *